Patented Aug. 14, 1928.

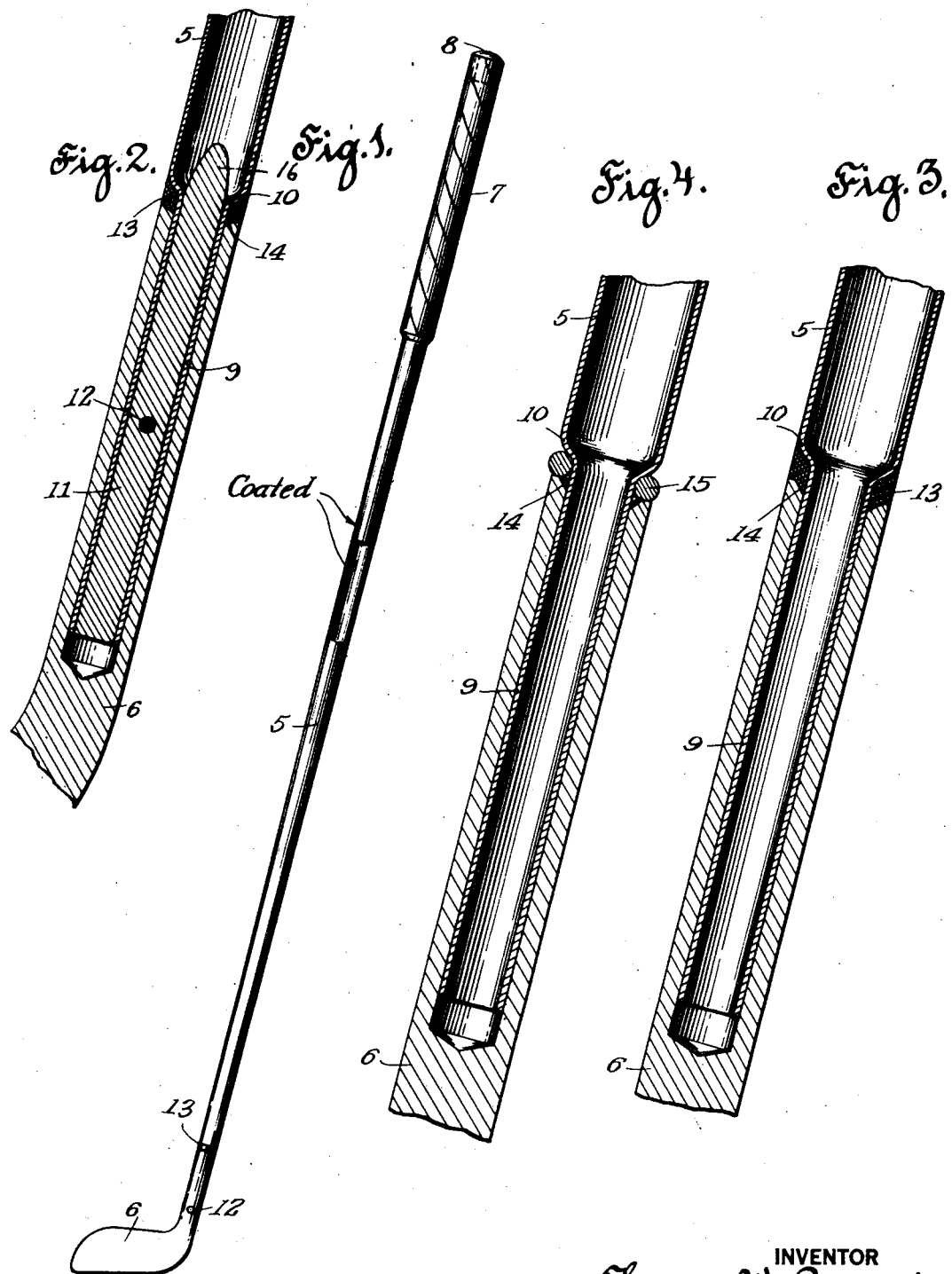

1,680,447

UNITED STATES PATENT OFFICE.

THOMAS W. BRYANT, OF TORRINGTON, CONNECTICUT.

GOLF CLUB.

Application filed June 6, 1927. Serial No. 196,832.

Tubular steel shafts have many advantages over wooden shafts but in making them sufficiently flexible and light in weight it has been found difficult to secure them properly in the usual types of club heads, particularly in "iron" heads. The thin walled tubes are also subject to rapid rust deterioration and to bending and breaking.

The main object of my invention is to overcome these objections and prolong the life of the clubs at a minimum of expense.

I accordingly coat the tube inside as well as outside with a rust-proof or non-corrosive substance and secure it in the socket of the head so as to keep out water. The joint is constructed so as to afford a sort of cushion at the end of the socket and prevent any sharp bend in the shaft over the edge of the socket.

Fig. 1 is a side view of one form of club involving my invention.

Fig. 2 is a sectional view on a larger scale showing one way of securing the shaft in a head.

Fig. 3 is a sectional view on a still larger scale showing the preferred joint between the shaft and head.

Fig. 4 shows a step in the formation of the joint.

The shaft 5 is preferably tapered and of thin tempered steel quite flexible and somewhat torsionable. The outside is preferably polished and plated with metal such as copper or nickel. The inside is preferably coated with paint, lacquer, japan or varnish which is sufficiently flexible and adhesive to prevent peeling or cracking. This can be applied inside by an atomizer or by flowing through the tube. The coating may be applied outside in any suitable manner. It may be applied both inside and outside by dipping.

The head 6 may be of any type. The handle end may have any suitable grip or extension 7. The upper end is closed by some sort of plug 8 to keep out moisture as much as possible.

The lower end 9 of the shaft is preferably reduced in diameter to fit in the socket of the head and provided with a shoulder 10 of substantially the same diameter as the socket. A wooden reinforcing plug 11 may be driven into the lower end of the shaft. The shaft may be held by a pin 12 which passes through the socket, the shaft and the plug.

A metal seal 13 is interposed between the upper end of the socket and the shoulder 10. The entrance to the socket is undercut at 14 to form a recess for the seal 13 and also so as to avoid a sharp edge at the point about which the shaft has to bend. The seal may be formed from a copper or brass ring 15 softer than the socket and hammered or rolled into place. This forms a somewhat resilient edge or buffer to prevent sharp bending of the thin tube at this point. The seal 13 not only affords a smooth and attractive appearance but tends to prevent moisture from working in at this point.

When a plug 11 is used it may be tapered or rounded at the upper end 16 and extend somewhat above the upper end of the socket so as to distribute the bending area and keep the tube from buckling when its bent at this point which is subjected to great strain.

The outside of the shaft may be covered by carboloid, bakelite, or other flexible condensation product of phenol or the like as set forth in my application 40,767 filed July 1, 1925.

By coating the tube inside as well as outside with a suitable non-metallic composition its life may be prolonged almost indefinitely in spite of the fact that the steel is very thin—frequently only 10 to 15 thousandths of an inch.

I claim:

1. A golf club comprising a head having a socket, a tubular steel shaft having an end reduced in size to fit in said socket and a soft metal ring interposed between the end of the socket and a shoulder on the shaft.

2. A construction such as in claim 1 in which the end of the socket is undercut and the ring is forced into the undercut.

3. The combination with a head having a socket with an undercut recess at its upper end, a tubular metal shaft fitted in said socket and a relatively soft metal seal in said recess.

4. A golf club comprising a head having a socket, a tubular steel shaft coated on the outside and fitted at its lower end within said socket, a seal between said shaft and said socket, said shaft being coated on the inside with non-corrosive substance and a closure for the upper end of said shaft.

5. A golf club comprising a head having a socket, a tubular shaft having its lower end fitted in said socket, a wooden plug driven into the lower end of said shaft and having its upper end extending above said socket and a relatively soft metal ring on the outside of said shaft sealing the joint around the upper end of said socket.

6. A golf club comprising a head having a metallic socket, a tubular metallic shaft having one end secured in the socket, a yielding filler plug in that part of the shaft which is within the socket and a yielding ring surrounding said shaft at the outer end of the socket.

7. A golf club comprising a head having a socket, a shaft having an end of a size to fit in said socket, and a yieldable ring between the shaft and the upper end of said socket.

8. A golf club comprising a head having a socket, a tubular metallic shaft having an end of a size to fit in said socket, and a yieldable waterproof sealing ring between the shaft and the upper end of said socket.

9. A golf club comprising a head having a socket, a shaft having a shouldered lower end of a size to fit in said socket, the upper end of said socket being undercut and tapered outwardly from the inside and sealing means at the upper end of said socket adjacent the shouldered portion of the shaft.

10. A golf club comprising a head having a socket, a tubular metallic shaft having an end of a size to fit in said socket, and a yieldable waterproof sealing ring between the shaft and the upper end of said socket, the shaft being shouldered and enlarged adjacent and above said ring.

11. A golf club comprising a head having a socket, a tubular metallic shaft having an end of a size to fit in said socket, a yieldable waterproof sealing ring between the shaft and the upper end of said socket, and a plug inside said shaft and ring shaped to have the shaft flex over said plug and ring.

12. A golf club shaft comprising a head having a socket, a tubular metallic shaft having an end of a size to fit in said socket, the shaft adjacent said socket being enlarged to substantially the same outside diameter as the socket, and yieldable means betwen said shaft and socket against which said shaft may press in flexing.

13. A golf club comprising a head having a socket, a tubular metal shaft having an end of a size to fit in said socket, the upper end of said socket being undercut and tapered outwardly from the inside and a reinforcing plug within said shaft socket and terminating a short distance above the top of said socket.

THOMAS W. BRYANT.